March 13, 1928.
E. F. KEILIG
1,662,069
COMBINED GARDEN IMPLEMENT
Filed May 6, 1927
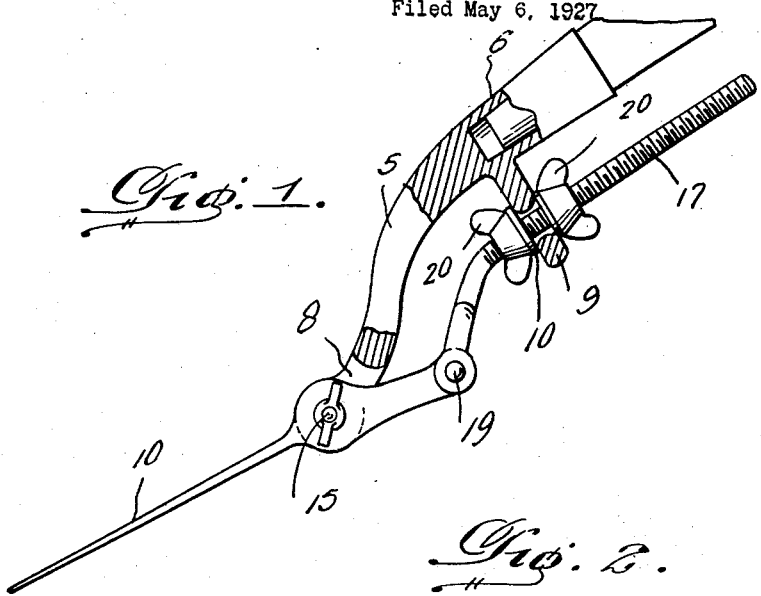
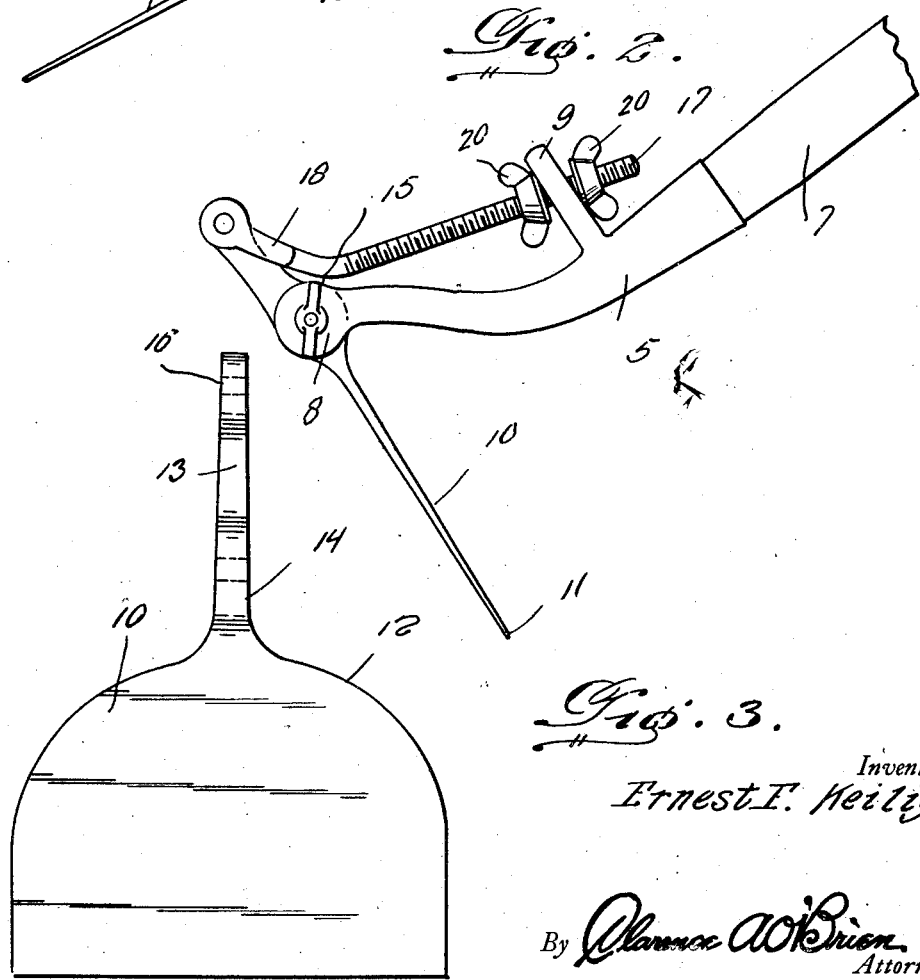
Inventor
Ernest F. Keilig
By Clarence A. O'Brien
Attorney Patented Mar. 13, 1928.

1,662,069

UNITED STATES PATENT OFFICE.

ERNEST F. KEILIG, OF RAVENNA, NEBRASKA.

COMBINED GARDEN IMPLEMENT.

Application filed May 6, 1927. Serial No. 189,243.

This invention relates to new and useful improvements in garden implements and aims to provide a device of this character that may be readily adjusted for facilitating the use of the same as a hoe, light spade, weed destroyer, and the like.

In carrying out my invention there is provided a socket member for disposition upon one end of a conventional handle and with which is pivotally associated a blade, means being provided between the socket member and the blade to permit the same to be swung at various angles and rigidly maintained at a predetermined angle so that the implement may be employed as a hoe, a light spade or some other closely related garden tool.

The present invention is characterized by its simplicity of construction and ease with which the blade may be adjusted at any predetermined angle with respect to the handle.

In the drawing wherein like reference characters indicate corresponding parts throughout the several views:

Figure 1 is a view partially in edge elevation and partially in longitudinal cross section of the improved implement, the conventional handle being fragmentarily disclosed, and the blade being in a position to permit the use of the same as a light spade or similar tool.

Figure 2 is a side elevation disclosing the blade as being adjusted to provide a garden hoe, in this instance it being necessary to turn the tool entirely over, and Figure 3 is a plan view of the blade, per se.

Now having particular reference to the drawing, 5 indicates a metallic shank 5 provided at one end with a tapered socket 6 for receiving the usual tapered end of a conventional wooden handle 7. The opposite end of this shank 5 is slightly curved downwardly and forwardly and is formed with a rounded and bifurcated extremity 8. At the inner end of the socket 6 of said shaft 5 said shank is formed with a right angular tongue 9 that is in turn formed with a relatively large opening 10, the edge of which is rounded as indicated in Figure 1.

The invention further consists of a suitable blade 11 having an elongated and plano front edge 11 and a rounded rear edge 12 from the center of which extends a longitudinal flat-like shank 13 formed adjacent the edge of the blade with a rounded portion 14 for disposition within the bifurcated end 8 of the handle attaching shank 5, said rounded portion being formed with an opening for registry with openings in the branches of said bifurcations so that the blade may be pivoted to the shank by a conventional pivot connection. The extreme end of this shank is also rounded and provided with an opening 16 for a purpose hereinafter more fully described.

Freely movable through the opening 10 in the shank tongue 9 is an elongated and threaded pin 17, the forward end of which is bent diagonally with respect to the longitudinal axis of the pins, the extreme forward end thereof being rounded and bifurcated as at 18 for receiving the rounded end 16 of the blade shank 13, the branches of the bifurcations as well as the rounded end of said shanks 18 and 16, respectively, being provided with registering openings so that the shank may be pivoted to the pin as at 19.

Threaded upon the pin 17 at opposite sides of the tongue 9 are wing nuts 20—20 for the purpose of rigidly securing the pin to the tongue after the blade 10 has been swung to the desired angle with respect to the handle attaching socket 5.

It will thus be seen that by reason of a device of this character the blade thereof may be readily adjusted and maintained in rigid adjusted position for providing various kindred garden implements.

Having thus described the invention, what I claim as new and desire to secure by Letters Patent is:—

In a convertible garden implement of the class described, a handle, a socket member including a socket receiving one end of the handle, and a longitudinally bowed shank terminating in a bifurcated head, said socket member being also provided with an angularly disposed apertured lug, an earth working blade provided with a shank having its intermediate portion disposed between the furcations of said bifurcated head and pivotally and separably connected therewith, a bolt pivotally connected to the free end portion of said shank and having an opposite end extending through the aperture in said lug, and retaining nuts carried by the threaded portion of the bolt and cooperable with the lug for holding said blade in different adjusted positions.

In testimony whereof I affix my signature.

ERNEST F. KEILIG.